US012039428B2

(12) United States Patent
Helenius et al.

(10) Patent No.: US 12,039,428 B2
(45) Date of Patent: Jul. 16, 2024

(54) MULTI-MODEL BASED TARGET ENGAGEMENT SEQUENCE GENERATOR

(71) Applicant: Palo Alto Networks, Inc., Santa Clara, CA (US)

(72) Inventors: Jere Armas Michael Helenius, Cupertino, CA (US); Nandan Gautam Thor, Mountain View, CA (US); Erik Michael Bower, San Francisco, CA (US); René Bonvanie, Foster City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/932,365

(22) Filed: Sep. 15, 2022

(65) Prior Publication Data

US 2023/0011066 A1   Jan. 12, 2023

Related U.S. Application Data

(63) Continuation of application No. 16/371,098, filed on Mar. 31, 2019, now Pat. No. 11,494,610.

(51) Int. Cl.
*G06N 3/044* (2023.01)
*G06N 3/045* (2023.01)
(Continued)

(52) U.S. Cl.
CPC ............ *G06N 3/044* (2023.01); *G06N 3/045* (2023.01); *G06N 3/08* (2013.01); *G06Q 30/0202* (2013.01)

(58) Field of Classification Search
CPC ...... G06N 3/0445; G06N 3/0454; G06N 3/08; G06N 7/005; G06Q 30/0202
(Continued)

(56) References Cited

U.S. PATENT DOCUMENTS

| 7,403,904 B2 | 7/2008 | Abe et al. |
| 7,945,473 B2 | 5/2011 | Fano et al. |
| 2020/0311585 A1* | 10/2020 | Helenius .................. G06N 5/01 |

FOREIGN PATENT DOCUMENTS

| AU | 2014237961 A1 | 9/2015 |
| CN | 108921624 A | 11/2018 |

OTHER PUBLICATIONS

Marry K. Pratt, Predictive analytics in marketing: Achieving success, 2021 (Year: 2021).*
(Continued)

*Primary Examiner* — Tarek Elchanti
(74) *Attorney, Agent, or Firm* — Gilliam IP PLLC

(57) ABSTRACT

To identify a target engagement sequence with a highest likelihood of realizing an opportunity, a target engagement sequence generator uses models (artificial recurrent neural network (RNN) and a hidden Markov model (HMM)) trained with historical time series data for a particular combination of values for opportunity characteristics. The trained RNN identifies a sequence of personas for realizing the opportunity described by the opportunity characteristics values. Data from regression analysis indicates key individuals for realizing an opportunity within each organizational classification that occurred within the historical data. The HMM identifies the importance of each persona in the sequence of personas with communicates to the key individuals. The resulting sequence of individuals indicates an optimal sequence of individuals and order for contacting those individuals in order to realize an opportunity. The importance values associated with the key individuals informs how to efficiently allocate resources to each individual interaction.

20 Claims, 5 Drawing Sheets

(51) Int. Cl.
*G06N 3/08* (2023.01)
*G06Q 30/0202* (2023.01)

(58) Field of Classification Search
USPC .......................................................... 706/20
See application file for complete search history.

(56) References Cited

OTHER PUBLICATIONS

Chandra, et al., "Evolutionary Training of Hybrid Systems of Recurrent Neural Networks and Hidden Markov Models", International Journal of Applied Mathematics and Computer Sciences vol. 3 No. 3, 2006, 6 pages.

Krakovna, et al., "Increasing the Interpretability of Recurrent Neural Networks Using Hidden Markov Models", 2016 ICML Workshop on Human Interpretability in Machine Learning (WHI 2016), New York, NY, USA., Sep. 30, 2016, 5 pages.

Lang, et al., "Understanding Consumer Behavior with Recurrent Neural Networks", Proceedings of the International Workshop on Machine Learning Methods for Recommender Systems. 2017., 8 pages.

Netzer, et al., "A Hidden Markov Model Of Customer Relationship Dynamics", Marketing Science, vol. 27, No. 2, Mar.-Apr. 2008, pp. 185-204.

Wessels, et al., "Refining Hidden Markov Models with Recurrent Neural Networks", Proceedings of the IEEE-INNS-ENNS International Joint Conference on Neural Networks. IJCNN 2000. Neural Computing: New Challenges and Perspectives for the New Millennium, Jul. 27, 2000, 6 pages.

\* cited by examiner

MULTI-MODEL BASED TARGET ENGAGEMENT SEQUENCE GENERATOR

BACKGROUND

The disclosure generally relates to the field of data processing, and more particularly to modeling, design, simulation, or emulation.

Artificial recurrent neural networks are a type of neural network with architecture that supports sequence data as inputs and outputs. The artificial recurrent neural network receives training data with desired outputs, and the difference between the desired and actual outputs is used to correct the internal parameters using backpropagation. The network is then validated on a hold-out set of data to ensure prediction accuracy on inputs apart from the training data. The architecture of artificial recurrent neural networks comprises successive layers, where the nth layer takes as input the nth term in an input sequence and the output of the $n-1^{st}$ layer and sends outputs to the $n+1^{st}$ layer and the nth term of the outgoing sequence. The architecture can further involve connections across multiple layers to improve sequence prediction by remembering previous sequence elements.

Hidden Markov models are statistical models that comprise unobserved hidden states and observations depending on the hidden states. Each hidden state is assumed to have a transition probability to every other hidden state, and an emission probability to each of the observations. It is intractable to guess the most likely parameters (probabilities) for the hidden Markov model based on a sequence of observations, however finding the local maximum likelihood solution for the parameters can be done via the expectation-maximization algorithm. There are additional methods for approximating the most likely model parameters with improved accuracy such as Markov chain Monte Carlo sampling and variational approximations to Bayesian inference. Typically, hidden Markov models are used to ask questions about the probability of a sequence of observations, or the probability of a hidden state given a sequence of observations.

BRIEF DESCRIPTION OF THE DRAWINGS

Embodiments of the disclosure may be better understood by referencing the accompanying drawings.

DESCRIPTION

Figure 1:
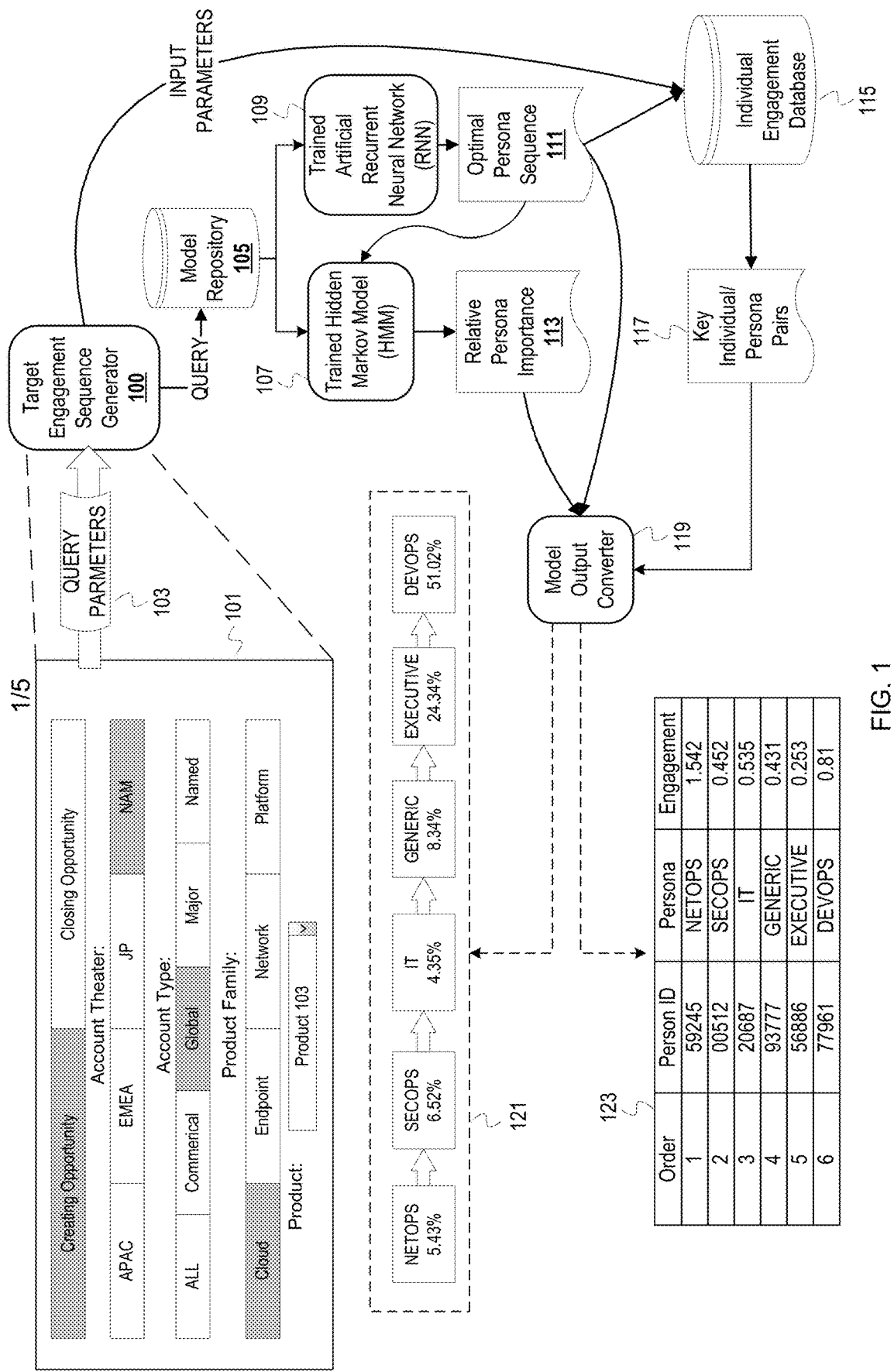
FIG. 1 is a conceptual diagram of a target engagement sequence generator responding to a create or close opportunity query specific to specified opportunity characteristics.

The description that follows includes example systems, methods, techniques, and program flows that may be included in embodiments of the disclosure. However, it is understood that this disclosure may be practiced without these specific details. For instance, this disclosure refers to combinations of opportunity characteristics including an account theater, an account type, and a product in illustrative examples. Aspects of this disclosure can be also applied to other combinations of opportunity characteristics, for example a product family and account id. In other instances, well-known instruction instances, protocols, structures and techniques have not been shown in detail in order not to obfuscate the description.

Overview

In many situations where a client/account pair is given, a sequence of individuals may be contacted in order to create or close an opportunity. The sequence of individuals involved in creating or closing an opportunity may be happenstance or may be a result of a careful strategy. Careful strategies may be constructed to choose a sequence of individuals that maximizes the chance at a desired outcome from creating or closing an opportunity (e.g., selling a product or service). These strategies typically require many hours of human labor and expertise specific to the opportunity. Moreover, these strategies are usually designed around personas, which may be a class of individuals within an organization defined by a title or role. A combination of models has been developed to identify a sequence of individuals with a highest likelihood of realizing an opportunity, whether creating or closing an opportunity, without the expense of substantial time and specialized human labor/expertise.

This designed application or service ("target engagement sequence generator") uses a combination of models that are trained with historical opportunity data (e.g., e-mail data, sales data, contract data, etc.) and instantiated for different combinations of opportunity characteristics values. The target engagement sequence generator selects a particular instance of a trained model pair to generate an optimal sequence of individuals to target to realize an opportunity defined by query parameters. To train the models, historical time series data from creating and closing opportunities with winning and losing outcomes are used. The data from opportunities are transformed into inputs for models that collectively inform how to choose the sequence of individuals with a highest likelihood to realize the opportunity. Initially, the historical time series data is fed into two regression models. The first regression model determines weights for each historical time series datum that is added as a feature to the historical time series data. The second regression model, based on weighted historical time series data from the first regression model, determines an engagement value for each individual encountered in the historical time series data. This second regression model enables segmentation of a persona, i.e., identifying within a persona a specific individual(s) that maximizes likelihood of realizing the opportunity. The identified individual(s) per persona are stored in an individual engagement database. The weighted historical time series data is then grouped by every combination of opportunity characteristics and sent to two different models for training. The first model is an artificial recurrent neural network (RNN) that receives historical sequences of personas and predicts the optimal sequence of personas to interact with for an opportunity. The second model is a hidden Markov model (HMM) that also receives the historical sequence of personas, and further incorporates the values of the outcomes of those sequences to predict the relative importance of each persona to the opportunity. Once trained, the models are stored in a model repository.

To identify a target engagement sequence with the highest likelihood of realizing an opportunity, the target engagement sequence generator uses the trained models based on opportunity characteristics. The target engagement sequence generator queries the model repository based on characteristics of an opportunity to retrieve a trained RNN and a trained HMM. The trained RNN identifies a sequence of personas, which can be combined with the engagement values retrieved from the individual engagement database to identify a sequence of individuals. The HMM identifies the importance of each individual in the sequence, which informs how to efficiently allocate resources to each individual interaction. These models can be efficiently applied to any incoming opportunity, enabling the individual-level segmentation of high likelihood interaction sequences at scale.

Example Illustrations

FIG. 1 is a conceptual diagram of a target engagement sequence generator responding to a create or close opportunity query specific to specified opportunity characteristics. A target engagement sequence generator 100 receives query parameters 103 from a graphical user interface (GUI) 101, which may be a component of the target engagement sequence generator 100 or a separate program that passes the query parameters 103 via inter-process communication. The target engagement sequence generator 100 retrieves from a model repository 105 a trained artificial recurrent neural network (RNN) 107 and a trained hidden Markov model (HMM) 109 based on the query parameters 103. Based on input parameters from the query parameters 103, the RNN 107 and HMM 109 respectively output an optimal persona sequence 111 and a relative persona importance 113. The target engagement sequence generator 100 also interacts with an individual engagement database 115 based on the optimal persona sequence 111 to obtain key individual/persona pairs 117. A model output converter 119 combines outputs 111, 113, and 117. A persona sequence 121 with quantified importance is an example of a possible output of the model output converter 119 after combining the optimal persona sequence 111 and relative persona importance 113. Individual sequence and engagement table 123 is another possible output of model output converter 119, after combining the optimal persona sequence 111 with the key individual/persona pairs 117.

FIG. 1 depicts the GUI 101 that presents options for choosing values for opportunity characteristics for a selected opportunity type. In this illustration, the GUI 101 presents opportunity types of creating an opportunity and closing an opportunity. The GUI 101 also presents for selection values or options for several opportunity characteristics, including the account theater, the account type, the product family, and the product. Upon detection of a submit event (e.g., activation of a submit button that is not depicted), the GUI 101 communicates the selected opportunity characteristics values as the query parameters 103 to the target engagement sequence generator 100. The query parameters 103 determine the choice of trained RNN 107 and trained HMM 109 from the repository of models 105, according to the combination opportunity characteristics values which can include the account theater, account type, and product.

The target engagement sequence generator 100 invokes the trained RNN 107 to obtain the optimal persona sequence 111. The trained RNN 107 can generate a seed for initial input and receive the seed as input, then iteratively feed the resulting output as input to generate a sequence of personas. For example, a seed can be chosen uniformly at random among all first personas from sequences of personas in previously seen won opportunities for the combination of opportunity characteristics. The optimal persona sequence 111 comprises the output sequence of personas once a predetermined sequence length or end state has been reached.

The target engagement sequence generator 100 also invokes the trained HMM 109 with the optimal persona sequence 111 as input. The trained HMM 109 comprises hidden states and output states, as well as pretrained transition probabilities between hidden states and output probabilities between hidden states and output states. In this model, the hidden states represent personas and the output states represent the sale amount at the end of a sequence of personas. Thus, the output probability between a persona and sale amount represents the likelihood that persona generates that sale amount. The trained HMM 109 generates the relative persona importance 113 by computing the expected output (sale amount) of each hidden state (persona) using the output probabilities. For a given persona, this can be computed as the inner product of a vector of output probabilities from a hidden state representing the given persona and a vector of output states. The computation yields an expected sale amount, or "importance," corresponding to the given persona. An importance value is computed for each persona in this way. The importance values can be rescaled so that the sum over every importance value is equal to 100 (i.e. percentages). The relative persona importance 113 comprises a set of personas and the importance value of each persona.

The target engagement sequence generator 100 accesses the individual engagement database 115 based on the opportunity characteristics indicated in the query parameters 103 and based on the optimal persona sequence 111. Individual engagement database 115 stores the engagement of individuals as well as additional metadata for each individual. The engagement of each individual can be precomputed using a regression model on historical time series interaction data. The key individual/persona pairs 117 comprises the individual/persona pairs as well as the engagement value of the corresponding individuals identified as "key" with the regression models during a training phase of the target engagement sequence generator 100. The key individual/persona pairs 117 may also include metadata about each individual.

Model output converter 119 receives optimal persona sequence 111, relative persona importance 113, and key individual/persona pairs 117. Model output converter 119, for each persona in optimal persona sequence 111, retrieves the corresponding relative persona importance 113 and concatenates them to generate output 121. Each persona has the importance value from relative persona importance 113 displayed below it as a percentage, and the personas are ordered from left to right in order of optimal persona sequence. In the given example, the optimal first persona in order to create an opportunity is NETOPS and the corresponding importance value of this persona is 5.43%.

Model output converter 119, for each persona in optimal persona sequence 111, retrieves the key individual in that persona as well as metadata for that individual from the key individual/persona pairs 117, and concatenates the persona sequence and corresponding individual metadata for output 123. Table 123 depicts 4 columns: the order, person id, persona, and engagement. The order ranges from 1 to 6 and represents the order with which to interact with individuals to maximize the likelihood of realizing the opportunity. The person id column specifies an identifier for each individual in the sequence. The persona column specifies the persona that each individual belongs to, and the engagement column is the metric received from the individual engagement database 115 for each individual. In some embodiments, table 123 can have additional metadata for each individual, including a contact name, email, title, etc.

Figure 2:
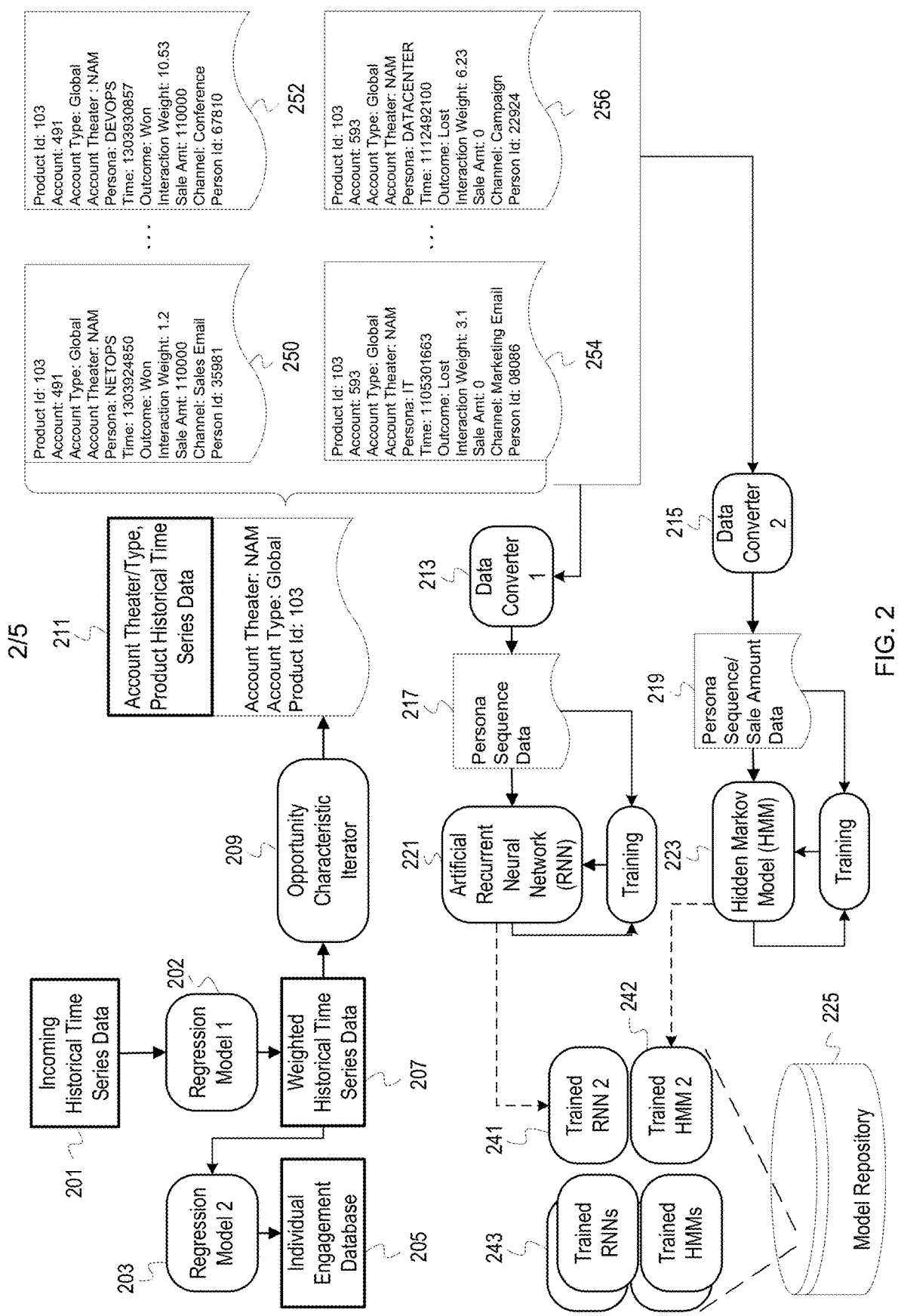
FIG. 2 depicts training for a target engagement sequence generator.

FIG. 2 depicts training for a target engagement sequence generator. Regression model 1 202 receives incoming historical time series data 201 comprising individual interactions in closing and creating opportunities with winning and losing outcomes. Regression model 1 202 outputs weights for each historical time series datum corresponding to an individual interaction, which is added to each datum as an attribute in a weighted historical time series data 207. Regression model 2 203 receives the weighted historical time series data 207 and outputs an engagement value for each individual based on the impact of the individual on winning outcomes in historical opportunities, which is fed into an individual engagement database 205. An opportunity characteristic iterator 209 iterates through every combination of opportunity characteristics and collects weighted historical time series data for each combination from the weighted historical time series data 207. One example of a combination of opportunity characteristics is given by account theater/type, product historical time series data 211. The opportunity characteristic iterator 209 sends a set of data 250, 252, 254, 256 specific to the combination of opportunity characteristics to data converter 1 213 and data converter 2 215. Data converter 1 213 transforms the data 250, 252, 254, 256 into persona sequence data 217 that is used to train an RNN 221. Data converter 2 215 transforms the data 250, 252, 254, 256 into persona sequence/sale amount data 219 that is used to train a HMM 223. Model repository 225 receives the trained RNN 221 and trained HMM 223 for future access. Model Repository 225 contains trained RNNs and trained HMMs 243 that have been trained on other combinations of opportunity characteristics from opportunity characteristic iterator 209.

The regression model 1 202 can split incoming historical time series data 201 into independent and dependent parts, where independent data comprises the sale amount attribute of each datum, and dependent data comprises every other attribute of each datum. The regression model 1 202 stores dependent data as rows in a "design" matrix and stores independent data as a "target" column vector where the nth entry of the column vector is the corresponding datum to the nth row of the matrix. The regression model 2 203 can split the weighted historical time series data 207 into independent data and weighted dependent data, where the weighted dependent data has an additional weight attribute. The regression model 2 203 can store the weighted dependent data as a weighted design matrix and the independent data as a target vector.

Regression model 1 202 and regression model 2 203 can perform various forms of regression analysis on the design/weight design matrix and column vector to determine, respectively, a weight for each time series historical datum, and an engagement value for each set of historical time series data corresponding to an individual. Individual engagement database 205 comprises the engagement values for each individual from regression model 2 203 as well as metadata associated with each individual. The choice of the above regression models can depend on the size and statistics of the historical time series data, and the allotted maximal training time. When determining weights for historical time series data, the regression model 1 202 and the regression model 2 203 can have unknown parameters corresponding to each historical time series datum. In some embodiments also when training time is limited, the unknown parameters for regression model 1 202 can correspond to possible values of the channel attribute. In other embodiments when training time is limited, the unknown parameters for regression model 2 203 can correspond to possible values of the person id attribute.

Weighted historical time series data 207 comprises the incoming historical time series data 201 with an added weight attribute computed by regression model 2 203. Opportunity characteristic iterator 209 receives the weighted historical time series data 207 and groups it by every combination of opportunity characteristics. Within each combination, the data can be further grouped by account, and sorted by time. In the example depicted, the opportunity characteristics are an account theater/type and product. The account theater/type and product historical time series data 211 corresponds to the combination of account theater North America ("NAM"), account type "global," and product id "103." Example data corresponding to this combination is depicted in data 250, 252, 254, 256 Data 250, 252 correspond to one historical interaction sequence in the prescribed account theater, account type, and product id, and data 254, 256 correspond to a different historical interaction sequence in the same account theater/type and product id. Data 250, 252 have the same product id, account, account theater, outcome, and sale amount data attributes, and different persona, time, interaction weight, channel, and person id data attributes. Data 250, 252 have the same product id, account type, and account theater attributes as data 254, 256. Data 254, 256 have the same product id, account, account, account theater, outcome, and sale amount data attributes, and different persona, time, interaction weight, channel, and person id data attributes.

At each iteration of the opportunity characteristic iterator 209, data converter 1 213 receives account theater/type, product historical time series data 211 and outputs persona sequence data 217 that can be fed into the RNN 221. Data converter 1 213 can prune the product id, account type, account theater, time, sale amount, channel, and personal id data attributes and keep the persona, outcome, and interaction weight data attributes. Categorical data attributes persona and outcome can be converted into numerical values. The numerical values can be normalized by mean and variance of each data attribute to have mean zero and variance one. In another embodiment, the numerical values can be normalized to be greater than zero and less than one. The type of normalization can depend on the architecture of the network and the statistics of the incoming time series data. The resulting numerical data can be split into training and test data. Persona sequence data 217 comprises the transformed numerical data.

The RNN 221 splits persona sequence data 217 into training and test data. In a first epoch, the RNN 221 trains on a portion of the training data until convergence or a maximal number of time steps is reached. The RNN 221 can be validated on the test data. If the validation error on the test data lies below a desired threshold, training can be terminated. Otherwise, the RNN 221 can continue to receive training data, train until convergence or a maximal number of time steps, then test for validation error. This process continues until a desired number of epochs is reached. An artificial recurrent neural network can have internal units that are long short-term memory units or gated recurrent units. The number and type of units can depend on the statistics of the incoming persona sequence data as well as the desired precision and training time of the artificial recurrent neural network.

For each iteration of the opportunity characteristic iterator 209, the data converter 2 215 receives account theater/type, product historical time series data 211 and outputs persona sequence/sale amount data 219 that can be fed into the HMM 223. The data converter 2 215 prunes the account theater/type, product historical time series data 211 such that only the persona, and sale amount data attributes remain.

The HMM 223 receives persona sequence/sale amount data 219. The HMM 223 is initialized with randomized internal parameters comprising transition and output probabilities. The hidden states of the HMM 223 correspond to a list of personas represented in the persona sequence/sale amount data 219. The output states correspond to possible sale amounts for each persona sequence. The transition and output probabilities are estimated using the persona sequence/sale amount data 219. HMM 223 trains on persona sequence/sale amount data 219 until convergence or a maximal time threshold is reached.

After training, a trained RNN 2 241 and a trained HMM 2 242 are stored into the model repository 225. These are stored along with other trained RNNs and HMMs 243 in the model repository 225. The training component of the target engagement sequence generator stores trained models into the model repository based on the combination of opportunity characteristics for which the models were trained. For instance, the trained RNN 2 241 and the trained HMM 2 242 can be tagged with key words that identify a specific product and account for which the training data was selected. When historical time series data for the combination of opportunity characteristics has been previously seen, the RNN 221 and HMM 223 can be previously trained models from model repository 225. In this case, the personal sequence data 217 and persona sequence/sale amount data 219 is, respectively, used to update RNN 221 and HMM 223 with additional training data. The updated trained RNN 2 241 and trained HMM 2 242 are then reinserted into model repository 225.

Figure 3:
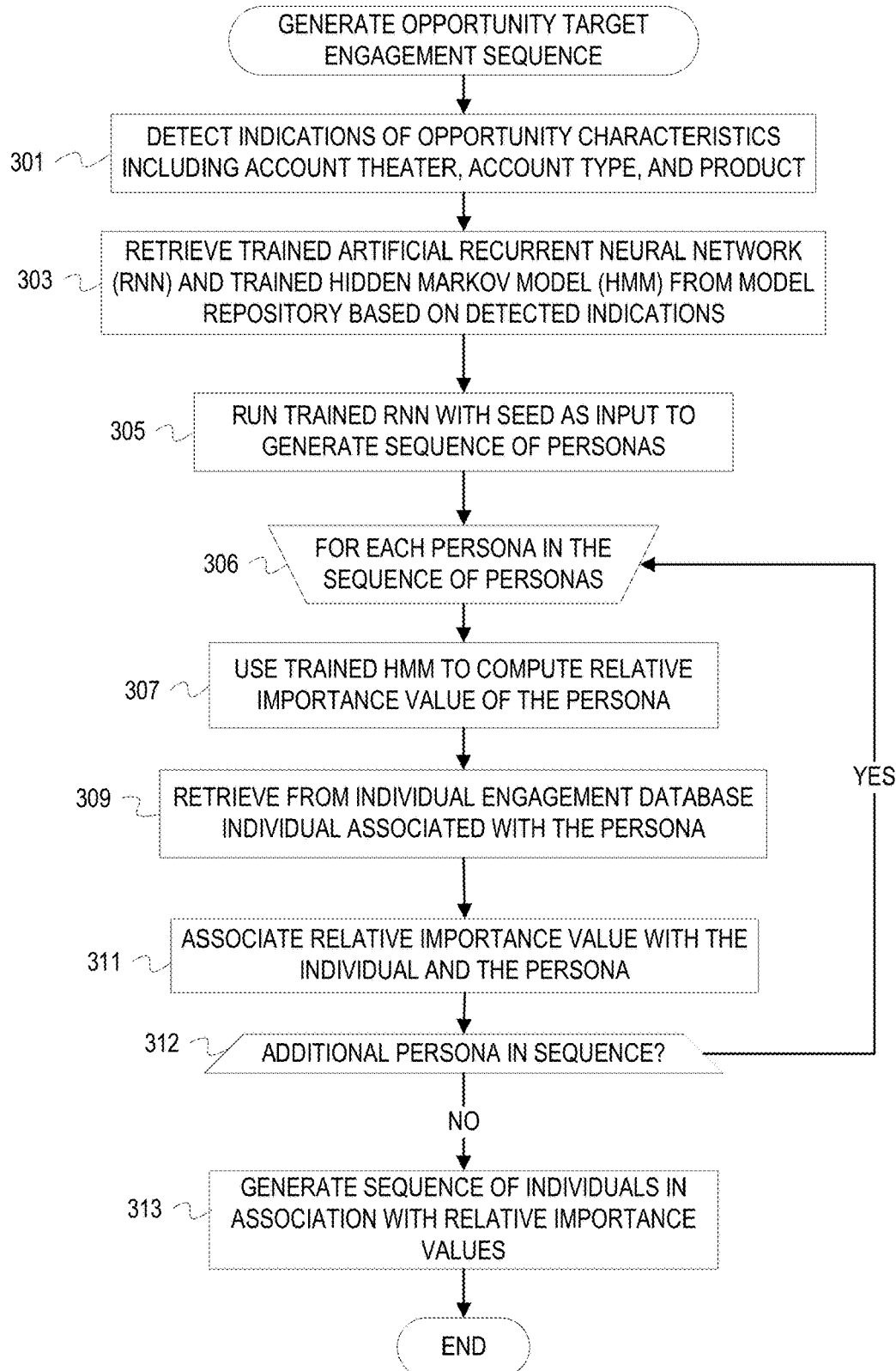
FIG. 3 is a flowchart of example operations for generating an opportunity target engagement sequence based on a trained HMM and trained RNN.

FIG. 3 is a flowchart of example operations for generating an opportunity target engagement sequence based on a trained HMM and trained RNN. The description of FIG. 3 refers to a target engagement sequence generator as performing the example operations for consistency with the earlier description. Naming or labeling of programs can be arbitrary, as well as modular organization of a program.

At block 301, the target engagement sequence generator detects indications of opportunity characteristics. Examples of opportunity characteristics include an opportunity type, an account theater, an account type, and a product. The target engagement sequence generator can detect values for or indications of opportunity characteristics using a variety of mechanisms, examples of which include via graphical user interface, receipt of a server query, based on monitoring a product database, etc. For different fields of opportunities, different opportunity characteristics can be received. For example, if the opportunity target engagement sequence is a sequence of people to contact in a hiring process, the opportunity characteristics could include a company size or a job title.

At block 303, the target engagement sequence generator retrieves a trained RNN and a trained HMM from a model repository based on the detected indications of opportunity characteristics. The target engagement sequence generator queries or searches the model repository with the detected opportunity characteristics indications. The model repository searches for models indexed by or tagged with the combination of opportunity characteristics indications in the query. Embodiments may split this into separate queries for the different models: a first query for a trained RNN that was trained for the indicated opportunity characteristics, and a second query for a trained HMM that was trained for the indicated opportunity characteristics. The trained RNN and trained HMM are previously trained on historical time series data corresponding to the detected opportunity characteristics.

At block 305, the target engagement sequence generator runs the trained RNN to generate a sequence of personas that would be optimal for realizing an opportunity with the indicated opportunity characteristics. The target engagement sequence generator can invoke a method or function that runs the trained RNN. In response to invocation, the trained RNN creates a seed as input and iteratively feeds output to itself as input to generate the sequence of personas for the indicated opportunity characteristics.

At block 306, the target engagement sequence generator begins iterating over the sequence of personas generated by the trained RNN and using the trained HMM. The target engagement sequence generator may invoke the trained HMM for each persona in the persona sequence or pass in the sequence of personas as an argument that the trained HMM iterates overs. This example uses operations that would invoke the trained HMM for each persona to help illustrate use of the trained HMM. The loop of operations includes the example operations depicted in blocks 307, 309, 311.

At block 307, the target engagement sequence generator invokes the trained HMM with an argument that is a persona j from the sequence of personas generated by the trained RNN. The trained HMM has a hidden state $x_j$ representing persona j and a corresponding set of output probabilities $o_{ij}$ for i=1 . . . T to output states with values $y_i$. The trained HMM computes the relative importance value for persona j as $\Sigma_{i=1}^{T} o_{ij} y_i$, where T is the total number of output states. Since the output probabilities $o_{ij}$ form a probability distribution when j is fixed, the importance value is an expectation under this probability distribution of the value of the output state $y_i$. In other words, the relative importance is the expected output value of persona j.

It may be noted that the trained HMM and the trained RNN can both be used to model sequences. However, because of the Markov property, the trained HMM does not have a memory of more than the current state in a sequence when it models transition probabilities between personas. Hence, a model that can track long term properties of sequences such as an RNN is preferred. As such, the transition probabilities between hidden states of the trained HMM are not used in the currently described embodiments.

At block 309, the target engagement sequence generator retrieves from an individual engagement database an individual (i.e., identifier of an individual) based on persona j. The target engagement sequence generator submits the persona j as a query to the individual engagement database. The individual engagement database can lookup persona j and retrieve metadata for a key individual within that persona. For example, the persona j may be an organization title/role or a business unit and the key individual would be an individual with the title/role or within the business unit. The key individual in persona j or matching persona j has been previously determined during analysis of the historical time-series data with the regression models.

If there is insufficient historical data for the given persona and detected opportunity characteristics, the individual engagement database can output a null value for the lookup.

As a result, the individual metadata can be left blank. This case is typically an indication that the models are possibly unreliable because of lack of data corresponding to the combination of opportunity characteristics. These factors can be indicated to facilitate consideration when evaluating the quality of the generated opportunity target engagement sequence.

At block 311, the target engagement sequence generator associates the relative importance value output by the trained HMM with the key individual identifier from the individual engagement database and with the persona j. The target sequence generator can maintain a data structure to store the associations as they are obtained for each persona.

At block 312, the target engagement sequence generator determines whether there is an additional persona in the sequence to process. If there is an additional persona to process with the trained HMM, then control returns to block 306. Otherwise, control continues to block 313.

At block 313, the target engagement sequence generator generates a sequence of individuals in association with the relative importance values output by the trained HMM. The target engagement sequence generator can be programmed to also preserve the association of personas with the relative importance values and individual identifiers depending upon desired display output.

Figure 4:
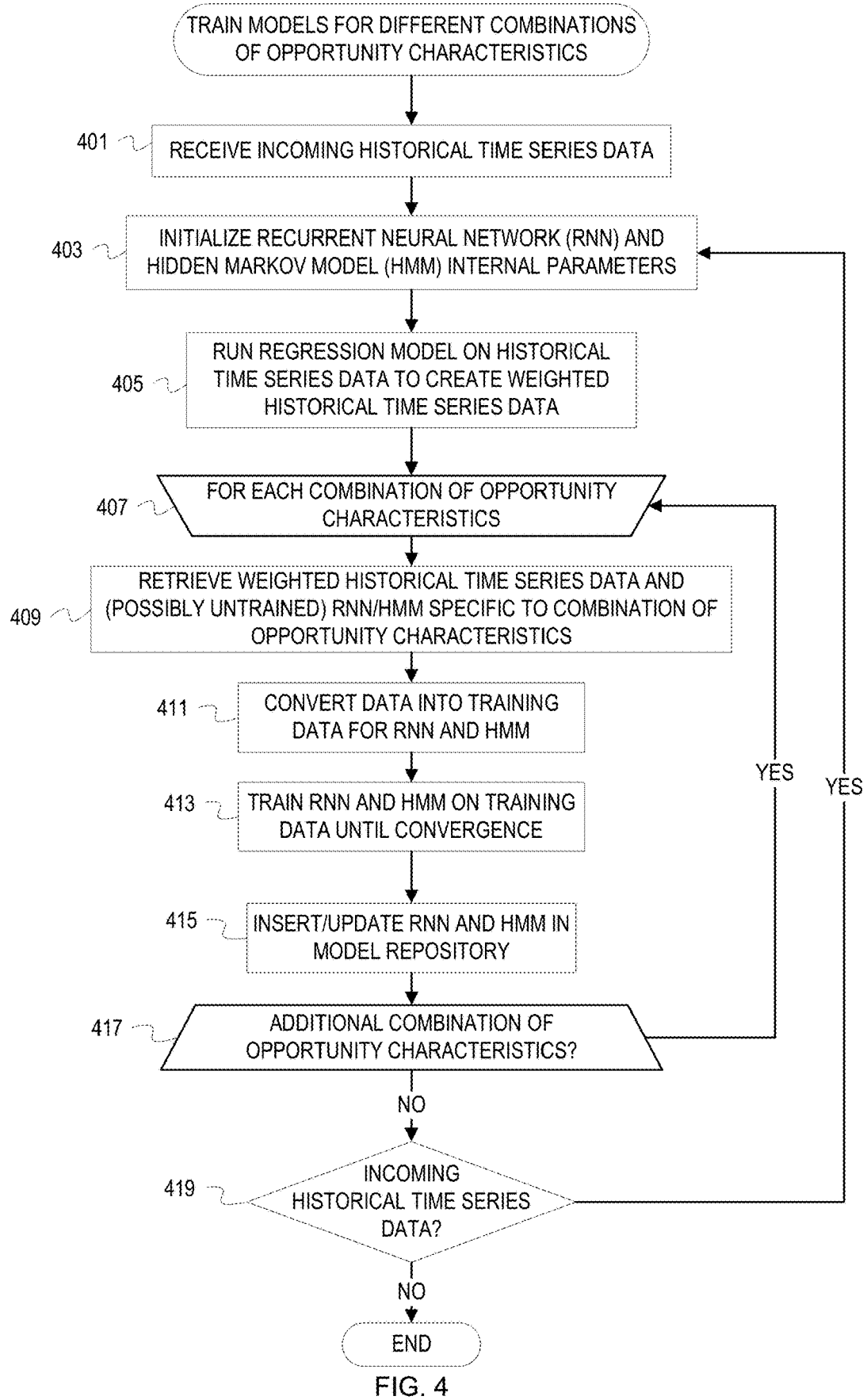
FIG. 4 is a flowchart of example operations for training RNNs and HMMs corresponding to different combinations of opportunity characteristics.

FIG. 4 is a flowchart of example operations for training RNNs and HMMs corresponding to different combinations of opportunity characteristics. The description of FIG. 4 refers to a "trainer" as performing the example operations. As previously mentioned, a program name can be arbitrary.

At block 401, the trainer receives incoming historical time series data comprising interactions from a data source. The data source can be a stream of data or a database that collects incoming data and stores it until set time intervals have expired. For example, a database can receive and store data, then the database can send a batch of currently stored data to update the models every week, month, quarter, etc.

At block 403, the trainer initializes untrained RNNs and untrained HMMs. The trainer can initialize the same number of untrained RNNs and HMMs as the number of possible combinations of opportunity characteristics. In other embodiments, the trainer can initialize untrained RNNs and HMMs based on combinations of opportunity characteristics from incoming historical time series data. For example, if historical time series data for account theater North America, account type Global, and product id 103 is received, and no RNN and HMM exists for this combination of opportunity characteristics, the trainer can initialize an untrained RNN and an untrained HMM for this combination of opportunity characteristics.

In typical embodiments, the trainer can choose initial internal parameters for the untrained RNNs randomly. The trainer can also choose the initial internal parameters based on previously trained models. The possible bias of such a choice of initial internal parameters should be considered. The trainer can initialize transition probabilities for the untrained HMMs to be uniformly at random between 0 and 1, or to be sampled according to a probability distribution that incorporates prior knowledge. Conversely, the trainer can initialize output probabilities in the untrained HMMs deterministically, based on the mean and variance of output values over all historical time series data corresponding to a given persona. For example, if the mean output value for persona j is 50 and the variance of the output values is 5, then the trainer can choose output probabilities from persona j such that the distribution of output values from persona j is approximately a normal distribution with mean 50 and variance 5. Such a distribution can be readily generated by someone of ordinary skill in the art by evaluating the cumulative distribution function of the normal distribution with mean 50 and variance 5 at the output values corresponding to output states.

At block 405 the trainer passes the incoming historical time series data into a regression model to determine weights for each historical time series datum comprising a single interaction. For instance, the trainer calls or invokes a regression model function from a package with the historical time series data as an input stream or a pointer to the location of the historical time series data. It will be computationally inefficient to compute a unique regression weight for every historical time series datum. In this case, unique weights can correspond to unique values of certain data attributes. For example, each channel of communication for an interaction can correspond to a specific weight. The target vector for the regression can be chosen to be the sale amount of each interaction, so that the weights are a measure of the contribution of each interaction or channel or other data attribute value to the resulting sale amount.

At block 407, the trainer begins iterating over combinations of opportunity characteristics. The trainer may iterate over only the combinations of opportunity characteristics present in the incoming weighted historical time series data. The loop of operations includes example operations 409, 411, 413, and 415.

At block 409, the trainer retrieves from the weighted historical time series data generated by running the regression model data corresponding to a given combination of opportunity characteristics. The trainer sends the combination of opportunity characteristics to a model repository, which either returns a trained or untrained RNN and HMM depending on whether weighted historical time series data corresponding to the combination of opportunity characteristics has been previously received. The trainer converts the weighted historical time series data corresponding to the given combination of opportunity characteristics into training data for the RNN and HMM at block 411. In some embodiments, the trainer can convert the data into training data in the manner described by data converter 1 213 and data converter 2 215.

At block 413, the trainer runs the RNN and HMM on batches of training data and after each batch, updates the internal parameters of the RNN and HMM based on the difference between model outputs and desired model outputs. Once the difference between model outputs and desired model outputs falls below a predetermined threshold, the training process has converged and training stops. If the RNN and HMM have been previously trained, the predetermined threshold can be large so that the additional training doesn't overfit the model to new data. The optimal value for the predetermined threshold is sensitive to the model architecture and statistics of the incoming weighted historical time series data. Once trained until convergence, the RNN is typically validated on the test data to ensure that training hasn't caused overfitting to the test data. This step can also inform future choices of predetermined threshold values. At block 415, once training has completed, the trainer reinserts the trained RNN and HMM into the model repository. The insertion can involve tagging or adding indexing information to allow for the trained RNN and HMM pair to be retrieved based on the combination of opportunity characteristics for which they were trained.

At block 417, the trainer determines whether there is an additional combination of opportunity characteristics in the weighted historical time series data. If there is another such combination, control returns to block 407. Otherwise, control continues to block 419.

At block 419, the trainer detects whether there is incoming historical time series data. If the trainer detects incoming historical time series data, control returns to block 403. Otherwise, training terminates.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in FIG. 3 can be performed to retrieve the trained HMM after the trained RNN generates the optimal sequence of personas. As another example, a target engagement sequence generator can eschew the trained HMM. Instead, the target engagement sequence generator can use a trained RNN to identify an optimal persona sequence for an opportunity as described by a set of opportunity characteristics values. Then the target engagement sequence generator can access the individual engagement database which has been populated with data identifying key individuals per persona based on the regression analysis during a training phase. The target engagement sequence generator can then generate the sequence of individuals to engage with highest likelihood of realizing the described opportunity. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
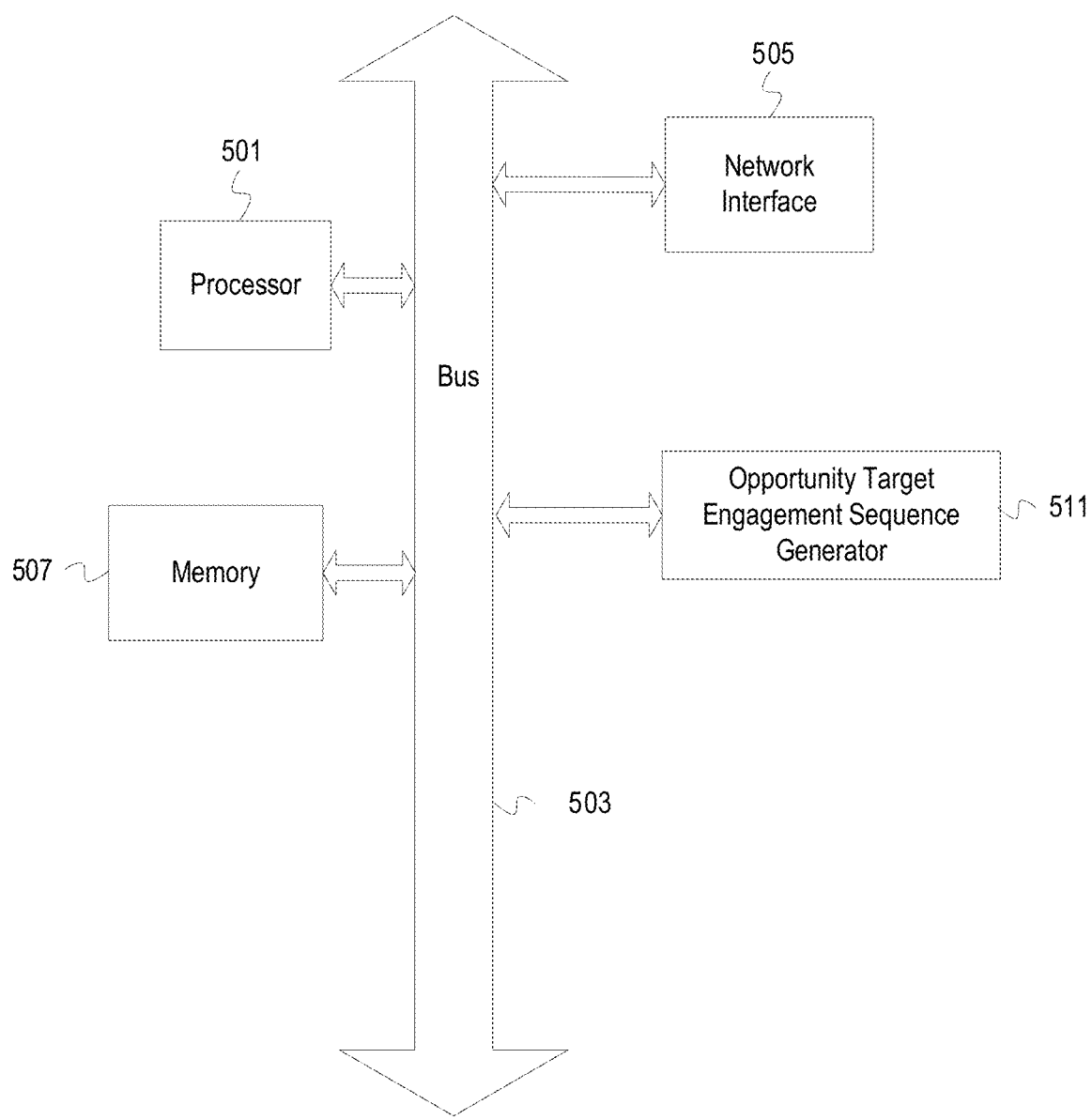
FIG. 5 depicts an example computer system with an opportunity target sequence generator.

FIG. 5 depicts an example computer system with an opportunity target engagement sequence generator. The computer system includes a processor 501 (possibly including multiple processors, multiple cores, multiple nodes, and/or implementing multi-threading, etc.). The computer system includes memory 507 or any one or more of the above already described possible realizations of machine-readable media. The computer system also includes a bus 503 and a network interface 505 (e.g., a wireless interface, wired interface, etc.). The system also includes an opportunity target engagement sequence generator 511. The opportunity target engagement sequence generator 511 uses a trained RNN and a trained HMM that have been trained for a particular combination of opportunity characteristics values to identify a sequence of individuals from identified personas with a highest likelihood of realizing an opportunity. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for multi-model based identification of an optimal sequence of targets to engage to realize an opportunity as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   determining a plurality of sequences of organizational classifications for a set of opportunity characteristics;
   retrieving historical time series data corresponding to the set of opportunity characteristics, wherein the historical time series data comprises data for a plurality of individuals and a plurality of opportunities;
   converting the historical time series data into first training data for a statistical model, wherein the first training data comprises a plurality of sale values for each of the plurality of sequences of organizational classifications indicated in the historical time series data;
   converting the historical time series data into second training data for a recurrent neural network, wherein the second training data comprises the plurality of sequences of organizational classifications and indications of success for each of the plurality of sequences of organizational classifications on opportunities corresponding to the set of opportunity characteristics;
   training the recurrent neural network on the second training data to output a sequence of organizational classifications that increases likelihood of conversion;
   training the statistical model on the first training data to output relative importance values for organizational classifications in the plurality of sequences of organizational classifications for the set of opportunity characteristics; and
   at least one of inserting in memory and updating in memory the trained recurrent neural network and the trained statistical model for generation of sequences of individuals to engage that increase success of opportunities satisfying the set of opportunity characteristics.

2. The method of claim 1, further comprising inputting the historical time series data into a regression model to output a plurality of values indicating impact of the plurality of individuals on the plurality of opportunities.

3. The method of claim 2, further comprising storing the plurality of values indexed by corresponding sets of opportunity characteristics for opportunities in the plurality of opportunities.

4. The method of claim 2, further comprising generating sequences of individuals with the trained recurrent neural network, the trained statistical model, and the plurality of values, wherein generating the sequences of individuals comprises:
   determining a sequence of organizational classifications based on inputting data for an opportunity satisfying the set of opportunity characteristics into the trained recurrent neural network;
   determining relative importance of organizational classifications in the sequence of organizational classifications based on inputting the sequence of organizational classifications into the trained statistical model; and
   associating an individual in the plurality of individuals with each organizational classification in the sequence of organizational classifications based on the plurality of values indicating impact the plurality of individuals.

5. The method of claim 1, wherein the set of opportunity characteristics comprises an account theater, an account type, and a product identifier.

6. The method of claim 1, wherein the historical time series data comprises sale data for historical opportunities comprising product identifiers, account identifiers, account types, account theaters, organizational classifications, time stamps, sale outcomes, sale amounts, sale channels, and individual identifiers.

7. The method of claim 1, wherein the trained statistical model is a trained hidden Markov model.

8. A non-transitory machine-readable medium having stored thereon program code comprising instructions to, for each set of opportunity characteristics in a plurality of sets of opportunity characteristics:
   determine a plurality of sequences of organizational classifications for the set of opportunity characteristics;
   retrieve historical time series data corresponding to the set of opportunity characteristics, wherein the historical time series data comprises data for a plurality of individuals and a plurality of opportunities;
   convert the historical time series data into first training data for a statistical model, wherein the first training data comprises a plurality of sale values for each of the plurality of sequences of organizational classifications indicated in the historical time series data;
   convert the historical time series data into second training data for a recurrent neural network, wherein the second training data comprises the plurality of sequences of organizational classifications and indications of success for each of the plurality of sequences of organizational classifications on opportunities corresponding to the set of opportunity characteristics;
   train the recurrent neural network on the second training data to output a sequence of organizational classifications that increases likelihood of conversion;
   train the statistical model on the first training data to output relative importance values for organizational classifications in the plurality of sequences of organizational classifications for the set of opportunity characteristics; and
   at least one of insert in memory and update in memory the trained recurrent neural network and the trained statistical model for generation of sequences of individuals to engage that increase success of opportunities satisfying the set of opportunity characteristics.

9. The non-transitory machine-readable medium of claim 8, wherein the wherein the program code further comprises instructions to input the historical time series data into a regression model to output a plurality of values indicating impact of the plurality of individuals on the plurality of opportunities.

10. The non-transitory machine-readable medium of claim 9, wherein the program code further comprises instructions to generate sequences of individuals with the trained recurrent neural network, the trained statistical model, and the plurality of values, wherein the instructions to generate sequences of individuals comprise instructions to:
   determine a sequence of organizational classifications based on inputting data for an opportunity satisfying the set of opportunity characteristics into the trained recurrent neural network;
   determine relative importance of organizational classifications in the sequence of organizational classifications based on inputting the sequence of organizational classifications into the trained statistical model; and
   associate an individual in the plurality of individuals with each organizational classification in the sequence of organizational classifications based on the plurality of values indicating impact of the plurality of individuals.

11. The machine-readable medium of claim 8, wherein the set of opportunity characteristics comprises an account theater, an account type, and a product identifier.

12. The non-transitory machine-readable medium of claim 8, wherein the historical time series data comprises sale data for historical opportunities comprising product identifiers, account identifiers, account types, account theaters, organizational classifications, time stamps, sale outcomes, sale amounts, sale channels, and individual identifiers.

13. The non-transitory machine-readable medium of claim 8, wherein the trained statistical model is a trained hidden Markov model.

14. An apparatus comprising:
   a processor; and
   a machine-readable medium having instructions stored thereon that are executable by the processor to cause the apparatus to:
   determine a plurality of sequences of organizational classifications for a set of opportunity characteristics;
   retrieve historical time series data corresponding to the set of opportunity characteristics, wherein the historical time series data comprises data for a plurality of individuals and a plurality of opportunities;
   convert the historical time series data into first training data for a statistical model, wherein the first training data comprises a plurality of sale values for each of the plurality of sequences of organizational classifications indicated in the historical time series data;
   convert the historical time series data into second training data for a recurrent neural network, wherein the second training data comprises the plurality of sequences of organizational classifications and indications of success for each of the plurality of sequences of organizational classifications on opportunities corresponding to the set of opportunity characteristics;
   train the recurrent neural network on the second training data to output a sequence of organizational classifications that increases likelihood of conversion;
   train the statistical model on the first training data to output relative importance values for organizational classifications in the plurality of sequences of organizational classifications for the set of opportunity characteristics; and
   at least one of insert in memory and update in memory the trained recurrent neural network and the trained statistical model for generation of sequences of individuals to engage that increase success of opportunities satisfying the set of opportunity characteristics.

15. The apparatus of claim 14, further comprising instructions executable by the processor to cause the apparatus to input the historical time series data into a regression model to output a plurality of values indicating impact of the plurality of individuals on the plurality of opportunities.

16. The apparatus of claim 15, further comprising instructions executable by the processor to cause the apparatus to store the plurality of values indexed by corresponding sets of opportunity characteristics for opportunities in the plurality of opportunities.

17. The apparatus of claim 15, further comprising instructions executable by the processor to cause the apparatus to generate sequences of individuals with the trained recurrent neural network, the trained statistical model, and the plurality of values, wherein the instructions to generate sequences of individuals comprise instructions executable by the processor to cause the apparatus to:
   determine a sequence of organizational classifications based on inputting data for an opportunity satisfying the set of opportunity characteristics into the trained recurrent neural network;
   determine relative importance of organizational classifications in the sequence of organizational classifications based on inputting the sequence of organizational classifications into the trained statistical model; and
   associate an individual in the plurality of individuals with each organizational classification in the sequence of organizational classifications based on the plurality of values indicating impact of the plurality of individuals.

18. The apparatus of claim 14, wherein the set of opportunity characteristics comprises an account theater, an account type, and a product identifier.

19. The apparatus of claim 14, wherein the historical time series data comprises sale data for historical opportunities comprising product identifiers, account identifiers, account types, account theaters, organizational classifications, time stamps, sale outcomes, sale amounts, sale channels, and individual identifiers.

20. The apparatus of claim 14, wherein the trained statistical model is a trained hidden Markov model.

* * * * *